United States Patent [19]

Matousek et al.

[11] Patent Number: 4,906,219
[45] Date of Patent: Mar. 6, 1990

[54] CLEANING SYSTEM FOR A COMBINE

[75] Inventors: Robert A. Matousek, Minooka; Jonathan E. Ricketts, Bolingbrook, both of Ill.

[73] Assignee: J. I. Case Company, Racine, Wis.

[21] Appl. No.: 326,170

[22] Filed: Mar. 20, 1989

Related U.S. Application Data

[63] Continuation-in-part of Ser. No. 232,421, Aug. 15, 1988.

[51] Int. Cl.⁴ .................. A01F 12/44; A01F 12/48
[52] U.S. Cl. ................................. 460/98; 56/12.8; 56/16.5; 415/203; 416/187; 460/99; 460/100
[58] Field of Search .......... 130/27 T, 27 HF, DIG. 5, 130/27 R; 56/12.8, 13.3, 16.5, 16.8, 14.6; 415/203; 416/187, 197 R; 460/98, 99, 100, 101, 102, DIG. 902

[56] References Cited

U.S. PATENT DOCUMENTS

| | | |
|---|---|---|
| 875,550 | 12/1907 | McCorkell . |
| 973,241 | 10/1910 | Vestal et al. ..................... 416/187 X |
| 2,612,742 | 10/1952 | Heth ..................................... 56/124 |
| 2,849,118 | 8/1958 | Ashton . |
| 3,469,773 | 9/1969 | Pool et al. . |
| 3,603,063 | 9/1969 | Stroburg . |
| 3,664,349 | 5/1972 | Quick . |
| 3,701,239 | 10/1972 | Hennen ............................... 56/13.5 |
| 3,797,502 | 3/1974 | Reed et al. ......................... 130/27 R |
| 3,800,804 | 4/1974 | Boone . |
| 3,813,184 | 5/1974 | Temple ............................... 415/54 |
| 3,833,006 | 9/1974 | Temple ........................... 130/27 HF |
| 4,250,897 | 2/1981 | Glaser .............................. 56/14.6 X |
| 4,265,077 | 5/1981 | Peters ................................... 56/14.6 |
| 4,436,484 | 3/1984 | Temple et al. ................... 416/187 X |
| 4,441,512 | 4/1984 | Busboom . |
| 4,442,847 | 4/1984 | Buck ............................. 130/27 R X |
| 4,497,162 | 2/1985 | Eguchi ................................. 56/14.6 |
| 4,627,446 | 12/1986 | Huhman . |
| 4,836,743 | 6/1989 | Gue on et al. ..................... 415/53.1 |

OTHER PUBLICATIONS

American Society of Agricultural Engineers Paper No. 69-623 entitled *On The Use Of Cross-Flow Fans In Grain Harvesting Machinery* by Graeme R. Quick, Associate Agricultural Engineering Department Iowa State University, Ames, Iowa.

Primary Examiner—Stephen J. Novosad
Attorney, Agent, or Firm—Dressler, Goldsmith, Shore, Sutker & Milnamow, Ltd.

[57] ABSTRACT

A cleaning system for a combine having a plurality of cleaning sieves which are operated to arrange grain in a thin veil or crop mat on the sieves. The cleaning system of the present invention includes an elongated transverse cleaning fan and an air plenum. The cleaning fan is rotatably driven about a fixed axis and includes a plurality of spaced apart blades peripherally disposed about the fan. The air plenum extends parallel to and along substantially the entire length of the fan for directing a forced flow of air from the fan rearwardly through the cleaning sieves. The air plenum includes upper and lower air directing baffles.

11 Claims, 4 Drawing Sheets

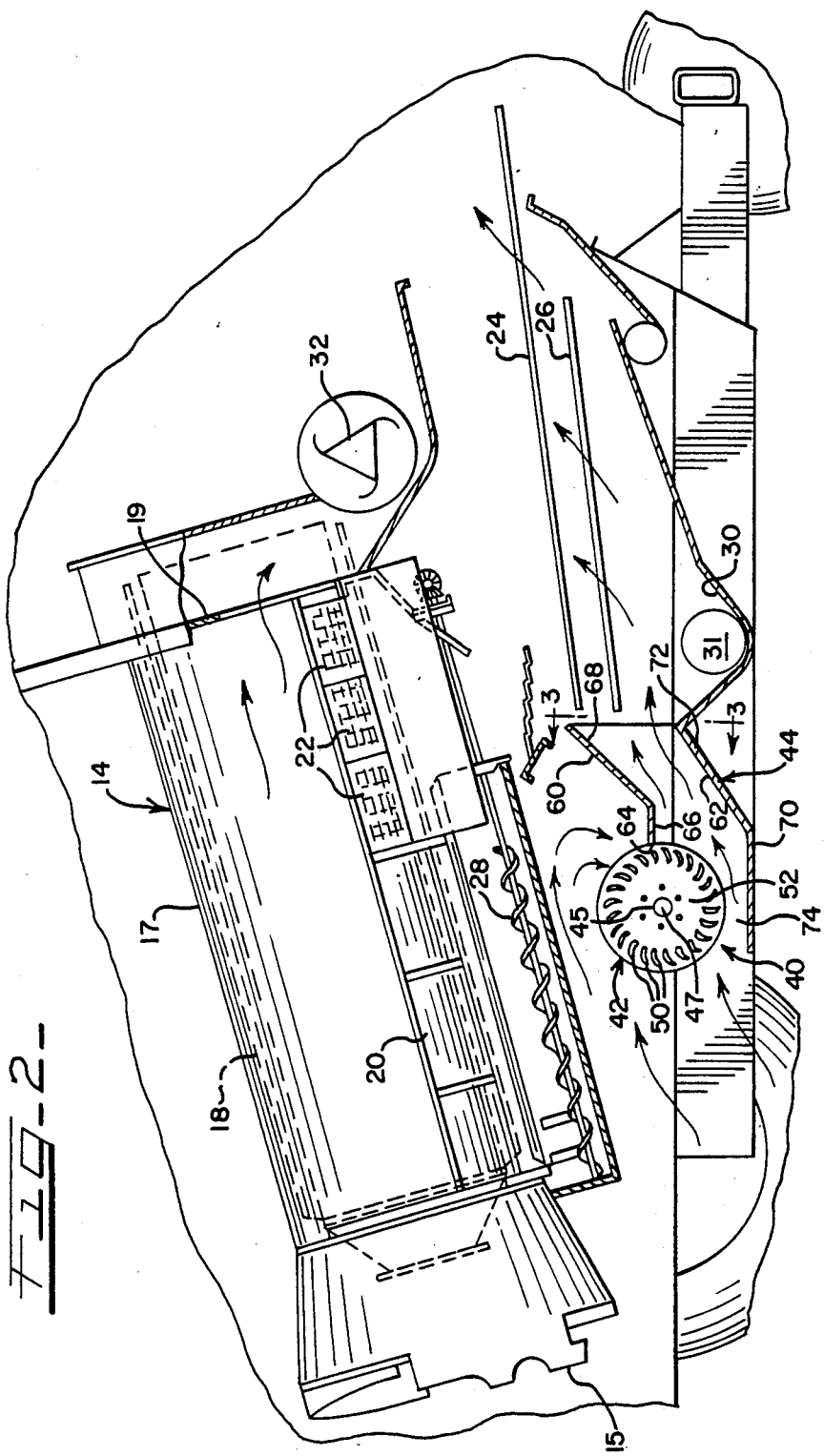

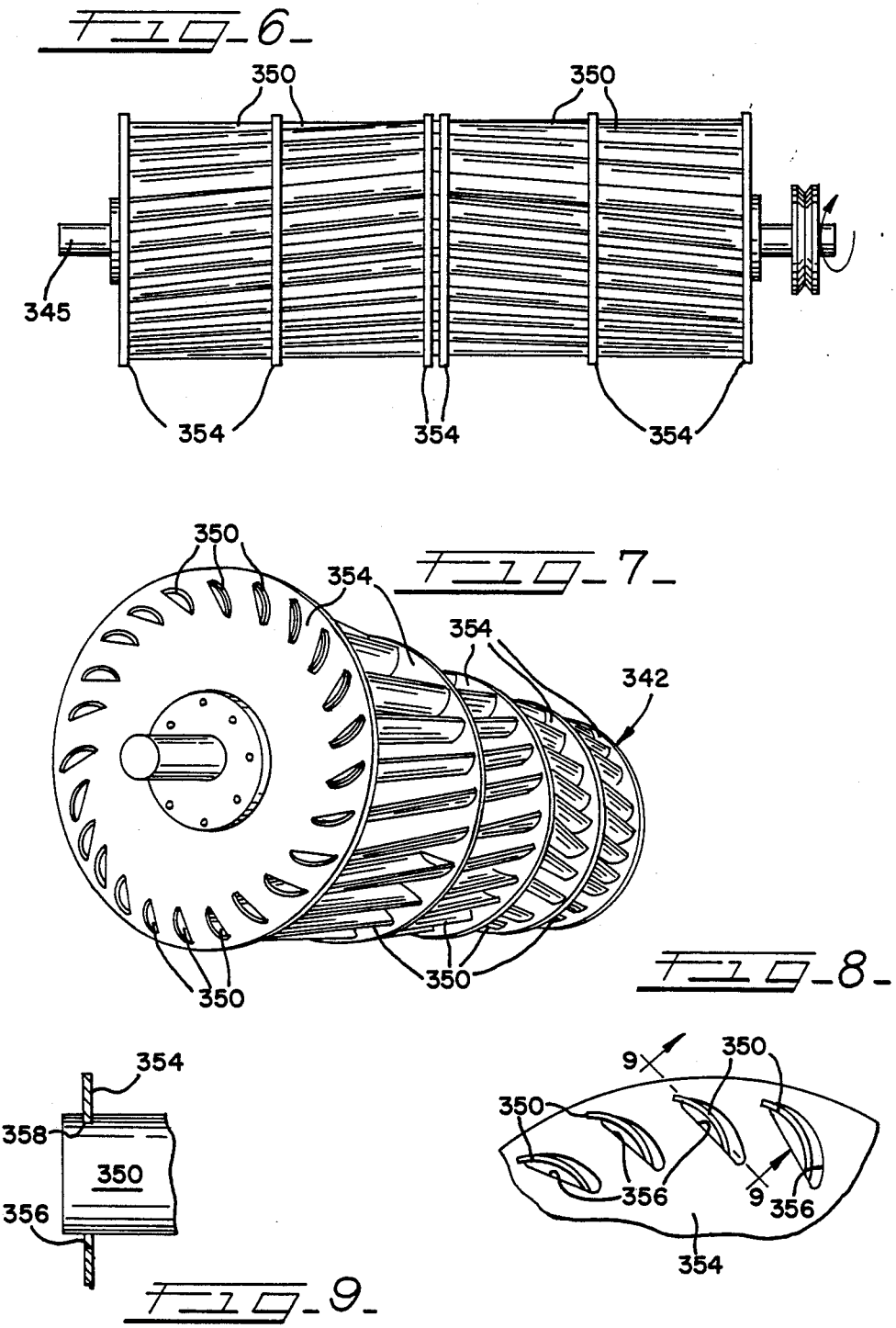

CLEANING SYSTEM FOR A COMBINE

RELATED APPLICATIONS

This is a continuation-in-part application of copending application Ser. No. 232,421, filed Aug. 15, 1988.

FIELD OF THE INVENTION

The present invention relates to combines and, more particularly, to a combine cleaning system including an elongated cleaning fan arranged in combination with an air plenum to increase the efficiency of separation of grain from material other than grain.

BACKGROUND OF THE INVENTION

Combines are old and well known in the art. They are available in various designs and models to perform the basic functions of harvesting, threshing and cleaning of grain or other crop materials.

A typical combine includes a crop harvesting apparatus which reaps planted grain stalks and then feeds the grain stalks to a separating or threshing apparatus. Preferably, the threshing apparatus includes a power-driven rotor mounted inside a stationary cylindrical threshing cage. The rotor threshes and separates the grain from the material other than grain. In such a combine, which has been available for a number of years, the grain is threshed several times repeatedly, but gently, as it spirals around the rotor and passes through openings in the threshing cage. Essentially, most material other than grain stays within the threshing cage and is directed out the rear end of the combine.

While the threshing apparatus acts to separate a substantial portion of the crop or grain from the material other than grain, some chaff or straw is directed out through the openings in the cage along with the grain and a further cleaning or separating action is required. Further separation is normally achieved in a cleaning section.

The cleaning section includes oscillating cleaning sieves. The cleaning sieves are located below the threshing cage to receive the grain and other material expelled from the cage. The oscillation of the sieves arranges the material in a crop mat or veil on top of the sieves. By forcing a stream of air upwardly through the sieves chaff, straw and other lighter material in the crop mat is separated from the heavier grain and is directed out through the end of the combine by the air flow. The heavier seeds or grain fall through the sieves into a collector.

With the increased power and output demands of modern grain combines, cleaning section capacity has become a limiting factor. The most readily achieved method of increasing combine capacity is by increasing the width of the combine and the sieves to spread the crop material across a wider area and in a thinner veil. Increasing the width of the cleaning sieves, so as to increase cleaning section capacity, also involves having to modify the air flow across the increased size of the cleaning sieves. The inherently uneven air distribution of known cleaning fans is accentuated with an increase in the width of the cleaning sieves.

The problem of increased air requirements could, of course, be diminished by increasing the fan diameter in proportion to its increase in its width. This proposed solution, however, is not practical. An increase in fan diameter would necessitate an increase in the height of the combine. The maximum overall height of the machine, however, is dictated by considerations such as clearance under bridges and barn doors. Another reason why the diameter of the fan cannot be increased is that a casing surrounding the fan is the lowest protrusion beneath the combine and, thus, it defines the ground clearance. For proper maneuverability of the combine, it is necessary to maintain adequate ground clearance. The overall height and ground clearance of combines have been reached within their practical limits. Therefore, increasing the diameter of the fan is not a feasible solution to the problem.

One attempt at solving the problem of providing increased air requirements involves a split fan design. With such a design, two fans are mounted on a common shaft. This is an expensive design. Moreover, increases in the width of the cleaning area likewise requires an increase in the fan's length resulting in non-uniform flow output along their length. A non-uniform air flow will be detrimental to proper operation of the cleaning system.

Blower devices commonly known as transverse-flow blowers have a blower wheel which includes a plurality of elongated blades arranged in a cylindrical pattern such that the blower wheel has a hollow interior. The stream of air produced by transverse-flow blowers is relatively thin. Since a combine cleaning system requires a relatively thick stream of air, the use of transverse-flow blowers in combine cleaning system is not a natural adaption.

Transverse-flow blowers are, however, appealing for this purpose because they conserve space and produce a wide uniform stream of air. In such a device, a fan rotor having a series of blades is rotatably arranged within a fan wrapper which encompasses and is closely spaced about the fan rotor. Relatively close tolerances and dimensions are required between the fan wrapper and fan rotor to achieve proper operation of the blower.

Because the blower device on a combine is disposed close to the ground over which the combine moves, the fan rotor, the fan wrapper, or both often engage rocks or other debris causing damage which requires maintenance to the blower. Repeated removal and replacement of such parts often modifies the relationship between the fan wrapper and fan rotor in a manner adversely effecting the performance of the cleaning system. Thus, the overall performance of the combine is often times adversely effected and production falls below an expected level.

SUMMARY OF THE INVENTION

In view of the above, and in accordance with the present invention, there is provided an improved cleaning system for a combine. The cleaning system includes a transversely mounted and elongated cleaning fan having a relatively large inlet area because there is no wrapper which surrounds or interferes with fan performance.

More specifically, there is provided a cleaning system for a combine having a crop harvesting apparatus attached to a forward end of the combine. A separating apparatus, enclosed within a housing, is arranged in crop receiving relation to the harvesting apparatus. Cleaning sieves are arranged in crop receiving relation with the separating apparatus.

One aspect of the present invention concerns an elongated transverse cleaning fan rotatably driven about a fixed axis. The fan is transversely mounted on the combine beneath the separator apparatus and forward of the cleaning sieves. The fan includes a plurality of peripherally disposed and spaced apart blades for developing an air stream which is directed toward the cleaning sieves.

Another aspect of the present invention concerns an improved air plenum for directing a forced flow of air from the fan rearwardly up through the cleaning sieves to blow chaff toward the rear end of the combine. Albeit extends parallel to and along the entire length of the fan, the air plenum does not encompass or surround the fan.

In accordance with the illustrated embodiment, the air plenum includes vertically spaced, upper and lower air directing baffles defining an air inlet which opens to the front of the combine. The upper air directing baffle extends rearwardly and upwardly from a forward edge which is positioned adjacent a rear peripheral edge of the fan. The lower air directing baffle includes a substantially horizontal first section extending beneath and in vertically spaced relation with the fan. The lower air directing baffle further includes a second section. The second section is joined to the first section and extends rearwardly therefrom at an acute angle to the horizontal. The first and second sections are joined at a location in substantial vertical alignment with the rearmost peripheral edge of the fan.

The first section of the lower air directing baffle preferably originates forwardly of the transverse fan axis. By such construction, the inwardly drawn air is directed rearwardly in an advantageous manner.

The upper air directing baffle of the air plenum preferably includes a substantially horizontal first section and a second section. The second section is joined to the first section and extends rearwardly at an acute angle to the horizontal. The first section of the upper air directing baffle originates adjacent a rear peripheral edge of the fan and is disposed in a relatively close vertical relationship to the rotational axis of the fan.

The cleaning fan is mounted on the combine to provide a substantially uniform stream of air across the cleaning sieves of the combine regardless of their width. The cleaning fan is illustrated as having the fan blades symmetrically slant or curve toward a center portion of the fan. The resultant flow of air off the blades is directed outward toward the fan ends and rearward in a manner improving fan performance by lessening end effects of the fan and thereby providing a more uniform stream of air across the cleaning sieves. It has been observed that slanting of the fan blades furthermore facilitates a reduction in the operating noise (sound) level of the fan. Accordingly, higher fan speeds can be used to increase the output flow of air from the fan without concern over environmental noise pollution. Alternatively, cone-shaped caps are secured at opposite ends of the cleaning fan to draw air from the fan center in a manner reducing the end effects of the fan.

The cleaning fan and air plenum cooperate to produce air velocities which are relatively high across the full length of the sieves to keep the crop mat open and suspended. Such air velocities, however, are not so high that clean grain is prevented from penetrating the cleaning sieves or is blown out the rear end of the combine and lost. Because there is no housing or closely wrapped casing about the fan, the present invention provides an easily maintained, simple structure of relatively low cost and which produces a beneficial air cleaning flow leading to maximum recovery of grain.

Other features and advantages of the present invention will become readily apparent from the following detailed description, the appended drawings, and the accompanying claims.

BRIEF DESCRIPTION OF THE DRAWINGS

FIG. 2 is a cross sectional view showing a separating apparatus and cleaning system of the combine;

FIG. 6 is a side view of still another modified transverse cleaning fan;

FIG. 7 is a perspective view of the cleaning fan illustrated in FIG. 6;

FIG. 8 is an enlarged side view of a fragmentary portion of the cleaning fan illustrated in FIG. 6; and FIG. 9 is a sectional view taken along line 9—9 of FIG. 8.

DETAILED DESCRIPTION

Figure 1:
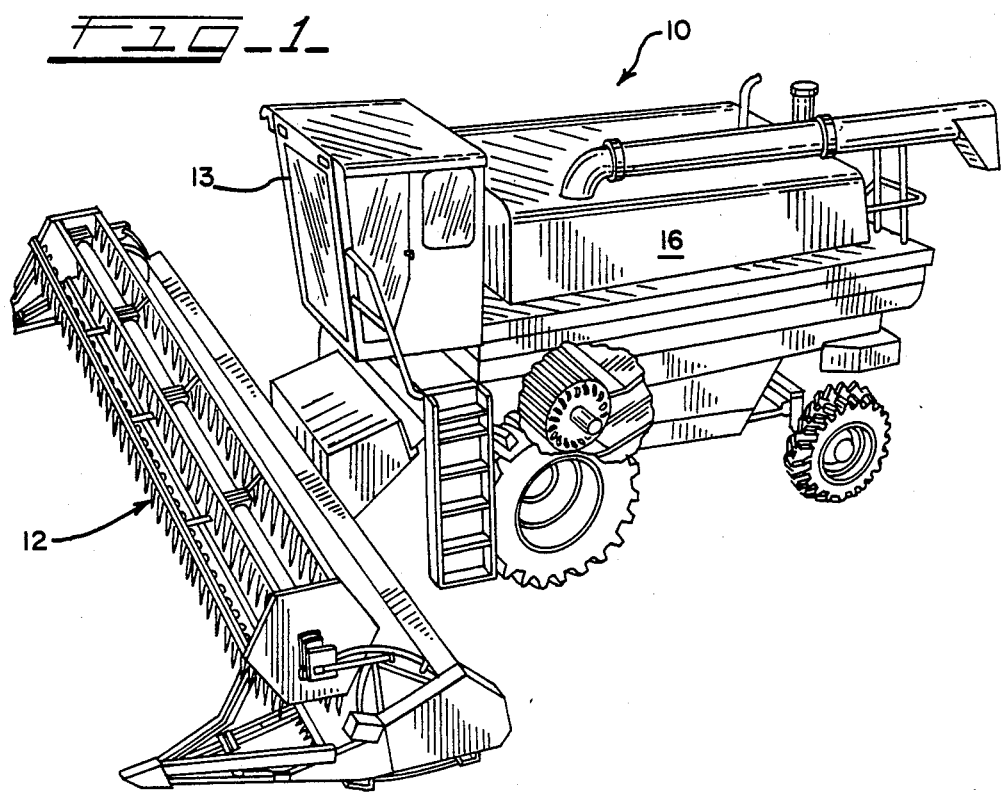
FIG. 1 illustrates a perspective view, partially broken way, of a combine.

While the present invention is susceptible of embodiment in various forms, there is shown in the drawings presently preferred embodiments of the invention which are hereinafter described, with the understanding that the present disclosure is to be considered as exemplifications of the invention, which are not intended to limit the invention to the specific embodiments illustrated.

Referring now to the drawings, wherein like reference numerals indicate like parts throughout the several views, there is shown in FIG. 1 a self-propelled combine 10. At its front end, combine 10 is provided with a crop harvesting apparatus or header 12 which can be of any suitable design and an operator's station 13. The combine is operatively powered by an engine (not shown) suitably housed therein to provide driving power for the combine. The transfer of rotation and power from the engine to the various driven components of the combine is of a conventional nature and could include fixed or variable belt or chain drives which are not shown for purposes of clarity.

The crop harvesting apparatus 12 cuts and directs crop material into a separating or threshing apparatus 14. Separating apparatus 14 is enclosed in a housing 16. In its preferred form, and as best seen in FIG. 2, the separating apparatus includes a threshing cage 17. Located within the threshing cage 17 is a coaxially disposed rotor 18. Rotor 18 directs crop material to be threshed from an inlet end 15 of the separating apparatus toward an exit end 19.

Between the inlet and exit ends of the separating apparatus 14, crop or grain is threshed several times repeatedly, but gently, as it spirals around the single large diameter rotor 18 and passes through the threshing cage. Disposed about the rotor is a simple system of concaves 20 and separating grates 22 which, through the action of the rotor and centrifugal force, act to separate grain from the majority of material other than grain and deliver such material to a pair of vertically spaced apart cleaning sieves 24 and 26. In the embodiment shown, augers 28 move grain to the cleaning sieves 24 and 26.

The sieves 24 and 26 are oscillated to separate the grain from material other than grain. The oscillation of sieves 24 and 26 arranges the materials deposited thereon in a relatively large crop mat or veil extending across substantially the entire sieve. The heavier grain falls through the sieves 24 and 26 to a clean grain collector 30. Auger 31 directs the grain from collector 30 into a hopper (not shown).

Material which is too large to pass through the grates 20 and concaves 22 is propelled rearwardly by rotor 18. A beater element 32, disposed rearwardly of separating apparatus 14, acts upon the material discharged from rotor 18. Suffice it to say, beater element 32 propels crop residue from the rear of the rotor and throws it back for discharge from the rear end of the combine.

A salient feature of the present invention concerns a cleaning fan assembly 40 arranged in combination with the cleaning sieves 24 and 26. Cleaning fan assembly 40 includes an elongated transverse cleaning fan 42 and an air plenum 44.

Fan 42 extends transversely across substantially the entire width of the combine 10. More specifically, fan 42 is transversely mounted on the combine beneath the separator apparatus 14 and forward of the cleaning sieves 24 and 26. An elongated shaft 45 defines a rotational axis 47 for fan 42. Opposite ends of shaft 45 are rotatably received in bearing assemblies 46 fixedly carried by opposed end walls 48 of housing 16. Housing 16 effectively closes the sides of fan 42.

Figure 3:
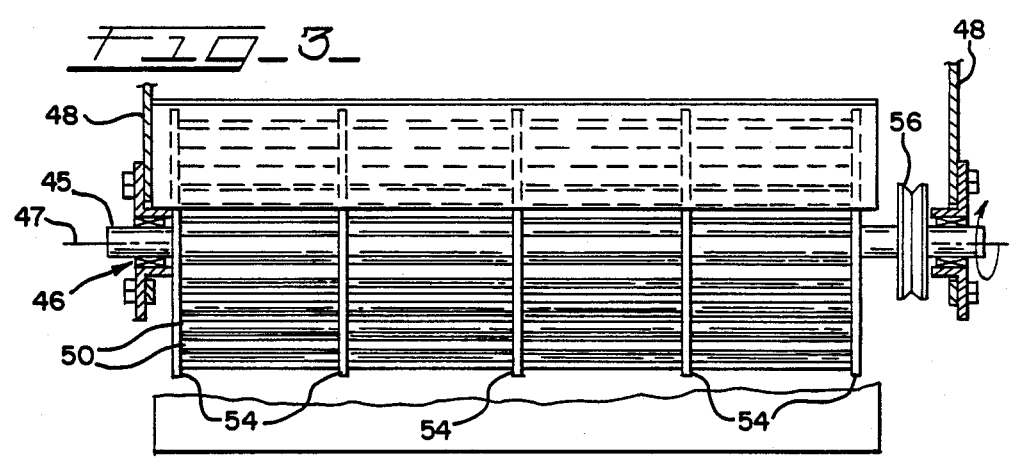
FIG. 3 is a side elevational view taken along line 3—3 of FIG. 2.

Fan 42 further includes a plurality of closely spaced forwardly curved, peripherally disposed blades 50. As seen in FIG. 2, blades 50 define an elongated opening 52 through the center of the fan. As best seen in FIG. 3, a series of axially aligned support plates 54, which are connected to shaft 45, circumferentially arrange and support blades 50.

Further mounted on shaft 45 is a pulley 56 which forms part of a variable speed fan drive. The variable speed fan drive permits the operator to adjust fan speed without having to leave the operator's station 13.

Air plenum 44 extends parallel to and along substantially the entire length of the fan 42 for directing air discharged from the fan toward the cleaning sieves. As best illustrated in FIG. 2, the air plenum 44 opens to the front end of the combine and provides a large inlet area to the fan because there is no wrapper which surrounds or interferes with fan performance. As illustrated, the air plenum 44 includes upper and lower air directing baffles 60 and 62, respectively. The upper and lower air directing baffles 60 and 62 are formed from a material such as sheet metal that is impervious to the passage of air.

Upper air directing baffle 60 defines a leading edge 64 which is positioned closely adjacent a rearmost peripheral edge of fan 42. Baffle 60 extends rearwardly and upwardly from its leading edge 64. Preferably, baffle 60 includes first and second sections 66 and 68, respectively. First section 66 of baffle 60 extends substantially horizontal. More specifically, the first section 66 of baffle 60 originates adjacent a rear peripheral edge of the fan. The first section 66 of baffle 60 extends rearwardly from the fan 42 and is vertically disposed proximate to a horizontal plane comprising the rotational axis 47 of fan 42. The second section 68 of baffle 60 is joined to the first section 66 and extends rearwardly at an acute angle to the horizontal.

The lower air directing baffle 62 includes first and second sections 70 and 72, respectively. The first section 70 extends substantially horizontal beneath and in vertically spaced relation with the fan to define an inlet opening 74 which extends across the length of the fan. Preferably, the first section 70 of the lower air directing baffle 62 originates forwardly of the transverse fan axis.

The second section 72 of baffle 62 is joined to the first section and extends rearwardly at an acute angle to the horizontal toward, and may be joined to, collector 30. The first and second sections 70, 72 of baffle 62 are joined at a location in substantial vertical alignment with the rearmost peripheral edge of the fan. By such construction, overflowing grain from collector 30 will drop out the forward end of the air plenum rather than being caught up in the fan's operation.

Figure 4:
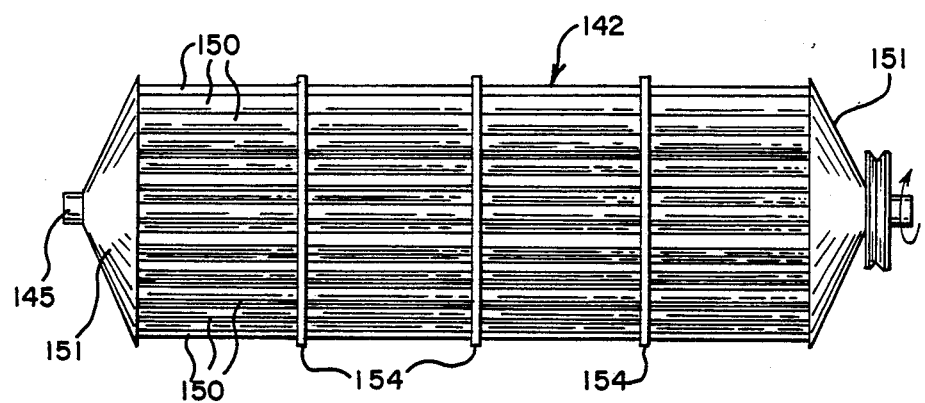
FIG. 4 is a side view of a modified transverse cleaning fan.

To avoid the grain from collecting on one area of the sieves, it is important to evenly distribute cleaning air flow across the entire width of the sieves. FIG. 4 illustrates one embodiment of a fan 142 which is designed to uniformly distribute air flow across the entire width of the cleaning sieves. While it is contemplated that fan 142 is to be used with an air plenum arrangement as described above, it will be appreciated that features of the fan described hereinafter will likewise facilitate an increase in combine efficiency with other arrangements capable of directing air toward the cleaning sieves.

Fan 142 is rotatably mounted in substantially the same manner as was fan 42 and extends transversely across substantially the entire width of the combine 10. Fan 142 includes an elongated shaft 145 defining a rotational axis for the fan 142. Fan 142 further includes a plurality of blades 150, with each blade preferably having a generally curved cross-sectional configuration. A series of axially aligned support plates 154, which are connected to shaft 145, support blades 150. A hollow conically shaped cap 151 is fixedly carried at opposite ends of the fan 142. Each cap 151 is formed from a material such as sheet metal that is impervious to the passage of air.

Figure 5:
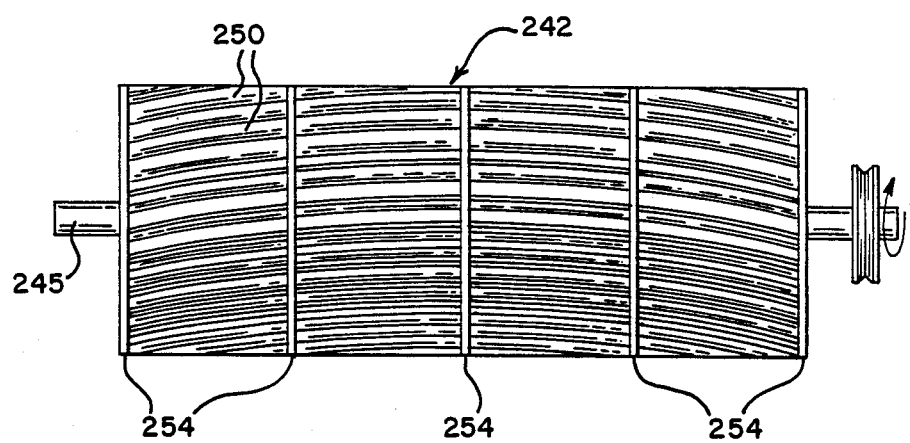
FIG. 5 is a side view of another modified transverse cleaning fan.

Another embodiment of a fan 242 is illustrated in FIG. 5. Fan 242 is rotatably mounted in a manner substantially similar to the mounting for fan 42 and extends transversely across substantially the entire width of the combine 10. Fan 242 is preferably arranged in combination with a suitable apparatus for directing air discharged from the fan toward the cleaning sieves. An elongated shaft 245 defines a rotational axis for fan 242. A series of axially aligned support plates 254, which are connected to shaft 245, support a plurality of blades 250, with each blade having a generally curved cross-sectional configuration. Blades 250 are peripherally arranged in a closely spaced relationship relative to one another and define an opening extending through the center of the fan 42. Each of the blades 250 symmetrically curve from opposite ends of the fan toward the longitudinal center of the fan.

Still another embodiment of a fan 342 is illustrated in FIGS. 6 through 9. Fan 342 is rotatably mounted on the housing 16 and is driven in substantially the same manner as fan 42. Fan 342 extends transversely across substantially the entire width of combine 10 and is arranged in combination with a suitable apparatus for directing air discharged from the fan toward the cleaning sieves.

Fan 342 includes a shaft 345 which supports and defines a fixed rotational axis for the fan. A series of support plates 354 are connected in axially spaced relation to the shaft 345. A plurality of elongated, spaced apart fan blades 350 pass through the axially spaced support plates 354 and are peripherally disposed about the fan 342. In a preferred form, each of the fan blades 350 have a generally curved cross-sectional configuration.

As illustrated in FIGS. 6 and 7, each fan blade 350 slants or tapers toward a longitudinal center portion of the fan. The resultant flow of air off the blades 350 is directed outward toward the fan ends and rearward in a manner improving fan performance by lessening end effects of the fan and providing a generally uniform air distribution across the cleaning sieves. Slanting of the fan blades 350 furthermore facilitates a reduction in operating noise (sound) level of the fan. Accordingly, higher fan speeds can be used to increase the output flow of air from the fan without concern over environmental noise pollution.

As illustrated in FIGS. 8 and 9, the fan blades 350 and support plates 354 are releasably interconnected such that replacement of any blade requires only a minimum amount of time. Preferably, the fan blades 350 are fabricated from sheet steel. Each support plate 354 defines a plurality of peripherally arranged slots 356 through which the fan blades 350 pass. As illustrated in FIG. 9, opposite ends of each fan blade are provided with an inwardly directed groove 358 provided along a longitudinal edge of a blade and having a thickness generally equal to the thickness of a support plate 354.

During fan fabrication, the angular relationship between adjacent support plates provided between a fan end and the fan center is adjusted such that the slots 356 in the axially spaced support plates 354 which support a common blade passing therethrough are angularly offset relative to each other in a progressive manner extending toward the middle of the fan such that each blade slants toward the middle of the fan. The angular offset between the slots 356 causes the blade to be simultaneously or conjointly twisted. The twisting action of the blade when combined with its slant toward the fan center causes the groove 358 in the blade to releasably engage and lock with a support plate 354 and maintain such engagement under the influence of the twist tension in the blades. As will be appreciated, replacement of a single blade requires only the overcoming of the twist tension in the blade and then removal of the blade through the slots from the fan 342.

Upon rotation, cleaning fan 42 draws air in along the full length of the fan about its outer circumference. The air hits the blade ring twice for a single rotation of fan 42 and is then forced out into the air plenum 44. The air plenum directs a forced flow of air from the fan rearwardly up through the cleaning sieves 26 and 28 to blow chaff toward a rear end of the combine. The above described design of the air plenum positions the vortex, generated by the rotating fan, to create a beneficial air flow.

The alternative fan embodiments shown in FIGS. 4, 5, and 6 through 9 diminish the end effects of the fan and provide a generally uniform air flow output across the width of the fan. More specifically, with respect to FIG. 4, as the air passes through the blade of fan 142, a vacuum is created in the cone caps 151. This vacuum draws air towards the ends of the fan in a manner diminishing end effects and provides a more uniform air distribution to the cleaning sieves.

In the embodiment shown in FIGS. 5 and 6 through 9, the fan blades are symmetrically curved or slanted toward a center portion of the fan. This curve or slant of the fan blades forces the air from the center of the fan, outward towards the ends whereby providing a more uniform air distribution. This forcing effect will happen twice on each blade on a single rotation of the fan. After air enters the blade it will move across the opening extending through the center of the fan parallel to the fan's rotational axis and be forced out toward the ends of the fan. As the air passes through the fan, the curving or tapering blades will again act on the air further forcing it sideways toward the ends of the fan in a manner diminishing end effects. The slanting of the blades furthermore facilitates a reduction in the operating noise level of the fan.

The advantages for this type of cleaning system is that a uniform velocity profile is created across the fan and, therefore, an unlimited width possibility exists for the fan. Therefore, the width of the cleaning section and, thereby, the capacity of the combine can be increased without adversely effecting the performance of the combine. Because the fan is not enclosed within a wrapper, the fan of this invention is simpler in structure and has less components. There are no side inlets for the fan and, therefore, the fan is not affected by side winds. Moreover, the fan may be designed much more compact and has a substantially lower profile aiding to the design of the combine.

Thus, there has been described numerous modifications or variations which can be effected without departing from the true spirit and novel concept of the present invention. It will be appreciated that the present disclosure is intended as an exemplification of the invention, and is not intended to limit the invention to the specific embodiments illustrated. The disclosure is intended to cover by the appended claims all such modifications as fall within the scope of the claims.

What is claimed is:

1. A cleaning system for a combine having a crop harvesting apparatus attached to a forward end of said combine, a housing enclosing a separating apparatus, said separating apparatus being arranged in a crop receiving relation to said harvesting apparatus, cleaning sieves arranged in crop receiving relation with said separating apparatus, said cleaning system comprising:

an elongated transverse cleaning fan rotatably driven about a fixed axis, said fan being transversely mounted on said combine beneath the separator apparatus and forward of the cleaning sieves and includes a plurality of spaced apart blades peripherally disposed about the fan; and an air plenum extending parallel to and along substantially the entire length of said fan and which opens to the front end of said combine for directing a forced flow of air from the fan rearwardly up through the cleaning sieves to blow chaff toward a rear end of the combine, said air plenum being arranged with respect to the fan to define a relatively large air inlet corresponding to more than one-half of the fan periphery without detracting from fan performance and a relatively small air outlet corresponding to less than about one-half of the fan periphery.

2. A cleaning system for a combine having a crop harvesting apparatus attached to a forward end of said combine, a housing enclosing a separating apparatus, said separating apparatus being arranged in a crop receiving relation to said harvesting apparatus, cleaning sieves arranged in a crop receiving relation with said separating apparatus, said cleaning system comprising:

an elongated transverse cleaning fan rotatably driven about a fixed axis, said fan being transversely mounted on said combine beneath the separator apparatus and forward of the cleaning sieves and includes a plurality of spaced apart blades peripherally disposed about the fan; and an air plenum extending parallel to and along substantially the entire length of said fan and which opens to the front end of said combine for directing a forced flow of air from the fan rearwardly up through the cleaning sieves to blow chaff toward a rear end of the combine, said air plenum includes upper and lower air directing baffles arranged with respect to the fan so as to provide a relatively large air inlet area corresponding to more than one-half of the fan periphery without detracting from fan performance, said upper air directing baffle extending rearwardly and upwardly from a forward edge positioned closely adjacent a rearmost peripheral edge of said fan, said lower air directing baffle including a substantially horizontal first section extending beneath in vertically spaced relation with said fan and a second section joined to said first section and extending rearwardly at an acute angle to the horizontal, said first and second sections being joined at a location in substantial vertical alignment with the rearmost peripheral edge of said fan.

3. A cleaning system according to claim 1 wherein the first section of said lower air directing baffle originates forwardly of said transverse fan axis.

4. A cleaning system according to claim 1 wherein the upper air directing baffle of said air plenum includes a substantially horizontal first section and a second section joined to said first section and extending rearwardly at an acute angle to the horizontal.

5. A cleaning system according to claim 4 wherein said substantially horizontal first section of said upper air directing baffle originates adjacent a rearmost peripheral edge of the fan and extends rearwardly therefrom, said horizontal first section being vertically disposed proximate to a horizontal plane comprising the rotational axis of said fan.

6. A cleaning system for a combine having a crop harvesting apparatus mounted to a forward end of the combine, a housing enclosing a separating apparatus, said separating apparatus being arranged in crop receiving relation to said harvesting apparatus, cleaning sieves arranged in crop receiving relation with said separating apparatus, said cleaning system comprising:

an elongated rotatable transverse cleaning fan transversely mounted on said combine beneath the separator apparatus and forward of the cleaning sieves and includes a plurality of peripherally disposed spaced apart blades with each blade curving toward a longitudinal center of the fan in a manner reducing end effects of the fan; and means extending parallel to and along substantially the entire length of said fan for directing a forced flow of air from the fan rearwardly up through the cleaning sieves to blow chaff toward a rear end of the combine.

7. The cleaning system of claim 6 wherein said fan further includes an elongated shaft which supports the fan for rotation and a series of axially aligned support plates which are interconnected with said elongated shaft.

8. A cleaning system for a combine having a crop harvesting apparatus mounted to a forward end of the combine, a housing enclosing a separating apparatus, said separating apparatus being arranged in crop receiving relation to said harvesting apparatus, cleaning sieves arranged in crop receiving relation with said separating apparatus, said cleaning system comprising:

an elongated transverse cleaning fan rotatably driven about a fixed axis, said fan being transversely mounted on said combine beneath the separator apparatus and forward of the cleaning sieves and includes a plurality of peripherally disposed spaced apart blades, with opposite ends of said fan having hollow cone-shaped cap means secured thereto for drawing air from center region of the fan toward the ends thereof whereby providing a generally uniform air output from the fan; and means extending parallel to and along substantially the entire length of said fan for directing a forced flow of air from the fan rearwardly up through the cleaning sieves to blow chaff toward a rear end of the combine.

9. A cleaning system for a combine having a crop harvesting apparatus arranged toward a forward end of the combine, a separating apparatus arranged in crop-receiving relation with said harvesting apparatus and enclosed by a housing, cleaning sieves arranged in crop-receiving relation with said separating apparatus, said cleaning system comprising:

a transverse cleaning fan rotatably driven about a fixed axis located on said combine beneath the separator apparatus and forward of the cleaning sieves, said fan having a plurality of elongated spaced apart blades peripherally disposed about the fan, with each blade slanting toward a center portion of the fan whereby enhancing fan performance by lessening end effects and providing generally uniform air distribution across the width of the fan; and means extending parallel to and along substantially the entire length of said fan for directing a forced flow of air from the fan rearwardly up through the cleaning sieves to blow chaff toward a rear end of the combine.

10. The cleaning system according to claim 9 wherein said fan further includes a shaft having a series of axially aligned support plates through which said blades pass and which are interconnected with said elongated shaft.

11. The cleaning system according to claim 10 wherein an end portion of each blade defines a groove which contacts in a releasable interlocking relation with the support plate through which the blade passes, said interlocking relation being established and maintained by conjointly twisting and slanting the blade during fan fabrication.

* * * * *

UNITED STATES PATENT AND TRADEMARK OFFICE
CERTIFICATE OF CORRECTION

PATENT NO. : 4,906,219

DATED : March 6, 1990

INVENTOR(S) : Robert A. Matousek and Jonathan E. Ricketts

It is certified that error appears in the above-identified patent and that said Letters Patent is hereby corrected as shown below:

Column 9, Claim 3, line 27, "1" should be -- 2 --;

Column 9, Claim 4, line 30, "1" should be -- 2 --; and

Column 10, Claim 11, line 56, "contacts" should be
-- coacts --.

Signed and Sealed this

Twenty-eighth Day of May, 1991

Attest:

HARRY F. MANBECK, JR.

Attesting Officer

Commissioner of Patents and Trademarks